(No Model.)

W. H. BOYD.
SPRING TREAD HORSESHOE.

No. 596,649. Patented Jan. 4, 1898.

Witnesses
Albert Popkins
Grau Goodman.

Inventor
William H. Boyd
By C. S. Sturtevant
Attorney

UNITED STATES PATENT OFFICE.

WILLIAM H. BOYD, OF SALT LAKE CITY, UTAH.

SPRING-TREAD HORSESHOE.

SPECIFICATION forming part of Letters Patent No. 596,649, dated January 4, 1898.

Application filed March 27, 1897. Serial No. 629,614. (No model.)

*To all whom it may concern:*

Be it known that I, WILLIAM H. BOYD, a citizen of the United States, and a resident of Salt Lake City, county of Salt Lake, State of Utah, have invented certain new and useful Improvements in Horseshoes, of which the following is a full, clear, and exact description.

My invention relates to an improvement in horseshoes, and particularly to what are known as "spring-tread" horseshoes; and it consists in the introduction of a spring at each heel end of the shoe on the underneath side, the object being to lessen the force of the concussion when the horse's feet come in contact with the ground, thus relieving the legs of the animal of all jar. This arrangement also acts to prevent the growth of corns and quarter-cracks.

The invention is illustrated in the accompanying drawings, in which—

Figure 1:
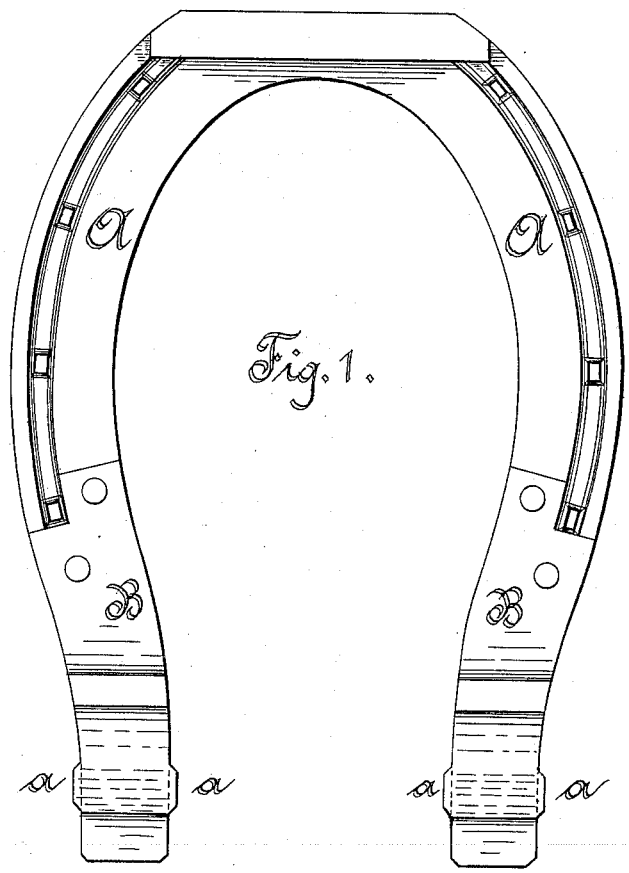
Figure 2:
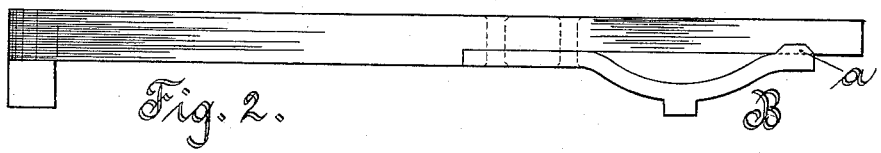

Figure 1 is a bottom plan view of a horseshoe constructed in accordance with my invention. Fig. 2 is a side elevation of a portion of a horseshoe embodying the invention; and Fig. 3 is a view similar to Fig. 2, showing a modification of the spring-tread arrangement.

In the drawings, A represents the body of the horseshoe, which may be secured to the hoof in any suitable way. Adjacent to the heel end on each side the body of the shoe is cut away to form a shoulder, to which is riveted, preferably by means of two rivets, to lie flush with the bottom of the shoe, the end of a steel spring B. This spring is curved in the manner shown, so that the bearing part thereof is beyond the body of the shoe normally, and at the end opposite that upon which it is riveted it has the upwardly-projecting flanges *a*, which fit over the heel ends of the shoe, the spring being guided always against the body of the shoe by means of these flanges.

These spring-tread devices are made of the very best spring-steel, so that it will hold its spring as long as it is desirable to keep any one shoe upon a horse's hoof, and as in the movement of the animal the spring works back and forth dirt or snow will not lodge permanently between the shoe and the spring. Furthermore, the present device may be applied with slight change to any shoe in use at the present time.

Figure 3:
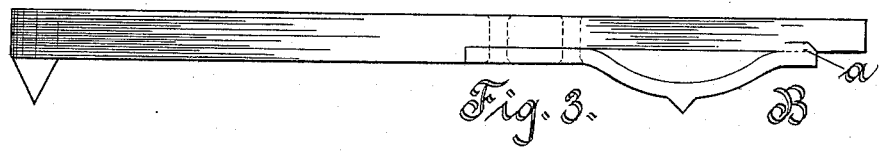

In Fig. 3 I show the bearing part of the spring-tread device as sharpened to form a calk for use in slippery weather.

I am aware that spring-tread devices for horseshoes have been heretofore proposed, as shown in numerous patents, but for simplicity of construction and effectiveness in operation and in the avoidance of jar to the animal I believe my device presents features of novelty and advantage.

Having thus described my invention, what I claim, and desire to secure by Letters Patent, is—

1. A horseshoe provided on its under side at the heels with spring-plates curved or bowed downwardly between their ends, the front ends of said plates being rigidly secured to the under side of the shoe, and their free rear ends sliding against the shoe; substantially as described.

2. The combination with a horseshoe, of downwardly curved or bowed spring-plates rigidly secured at their front ends to the under side of the heels of the shoe and bearing at their rear free ends against the shoe and there provided with upwardly-projecting flanges embracing the sides of the shoe; substantially as described.

3. A horseshoe provided with a spring-tread device curved to normally extend out of the plane of the body of the shoe but at each end in contact with said shoe, said spring-tread device at its bearing-point being sharpened to form a calk, substantially as described.

In witness whereof I have hereunto signed my name in the presence of two subscribing witnesses.

WILLIAM H. BOYD.

Witnesses:
MARY RANDS,
BENJAMIN W. JENNONS.